US011512705B2

(12) United States Patent
Omori

(10) Patent No.: US 11,512,705 B2
(45) Date of Patent: Nov. 29, 2022

(54) VACUUM PUMP

(71) Applicant: Edwards Japan Limited, Yachiyo (JP)

(72) Inventor: Hideki Omori, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 573 days.

(21) Appl. No.: 14/912,434

(22) PCT Filed: Jun. 6, 2014

(86) PCT No.: PCT/JP2014/065153
§ 371 (c)(1),
(2) Date: Feb. 17, 2016

(87) PCT Pub. No.: WO2015/029536
PCT Pub. Date: Mar. 5, 2015

(65) Prior Publication Data
US 2016/0195098 A1 Jul. 7, 2016

(30) Foreign Application Priority Data
Aug. 30, 2013 (JP) .............................. JP2013-179431

(51) Int. Cl.
*F04D 25/06* (2006.01)
*F04D 17/16* (2006.01)
(Continued)

(52) U.S. Cl.
CPC ....... *F04D 25/0693* (2013.01); *F04D 17/168* (2013.01); *F04D 19/042* (2013.01);
(Continued)

(58) Field of Classification Search
CPC .. F04D 13/0686; F04D 13/0693; F04D 17/16; F04D 17/164; F04D 17/168;
(Continued)

(56) References Cited

U.S. PATENT DOCUMENTS 4,526,432 A * 7/1985 Cronin ................. H01R 12/777
439/320
4,552,420 A * 11/1985 Eigenbrode ........ H01R 23/6873
439/65
(Continued)

FOREIGN PATENT DOCUMENTS

CA  2006968 A1  4/1991
CN  1163412 A   10/1997
(Continued)

OTHER PUBLICATIONS

Translation and original International Search Report received in International Application No. PCT/JP2014/065153 dated Sep. 2, 2014, 5 pgs.

*Primary Examiner* — Dominick L Plakkoottam
*Assistant Examiner* — Charles W Nichols
(74) *Attorney, Agent, or Firm* — Shumaker & Sieffert, P.A.

(57) ABSTRACT

The present disclosure provides a vacuum pump with which size and weight reduction, improvement of workability, and cost reduction can be realized. Electrical connection between a pump main body that has a rotor supported by a magnetic bearing and a control unit that controls the drive of the pump main body is established by a flexible printed wiring board configured by printing an electric circuit on a surface of a sheet-like insulating substrate.

9 Claims, 7 Drawing Sheets

(51) Int. Cl.
*F04D 29/42* (2006.01)
*F04D 29/28* (2006.01)
*H02K 11/33* (2016.01)
*F04D 19/04* (2006.01)
*F16C 32/04* (2006.01)

(52) U.S. Cl.
CPC ......... *F04D 19/048* (2013.01); *F04D 29/281* (2013.01); *F04D 29/4206* (2013.01); *F16C 32/0444* (2013.01); *H02K 11/33* (2016.01); *F16C 32/0489* (2013.01); *F16C 2360/45* (2013.01); *H02K 2211/03* (2013.01)

(58) Field of Classification Search
CPC .. F04D 25/068; F04D 25/0693; F04D 29/281; F04D 29/4203; F04D 19/042; F04D 19/048; F04D 29/4206; F16C 32/0444; F16C 32/0489; F16C 2360/45; H02K 2211/03; H02K 11/33
See application file for complete search history.

(56) References Cited

U.S. PATENT DOCUMENTS

| | | | | |
|---|---|---|---|---|
| 7,197,892 | B2 * | 4/2007 | Ioi | ............................ F04B 35/04 |
| | | | | 310/85 |
| 7,932,655 | B2 * | 4/2011 | Buhler | .................. F04D 19/048 |
| | | | | 310/68 B |
| 2004/0159930 | A1 * | 8/2004 | Makita | ................ H01L 23/4985 |
| | | | | 257/690 |
| 2005/0048809 | A1 * | 3/2005 | Bolen | .................. H01R 12/592 |
| | | | | 439/67 |
| 2006/0281352 | A1 * | 12/2006 | Kabasawa | ............ H01R 13/631 |
| | | | | 439/247 |
| 2008/0081512 | A1 | 4/2008 | Chawgo | |
| 2008/0185928 | A1 | 8/2008 | Buhler et al. | |
| 2008/0289067 | A1 | 11/2008 | Harris et al. | |
| 2010/0047095 | A1 * | 2/2010 | Englaender | ........... F04D 17/168 |
| | | | | 417/423.4 |

FOREIGN PATENT DOCUMENTS

| | | |
|---|---|---|
| CN | 101243263 A | 8/2008 |
| CN | 101253263 A | 8/2008 |
| CN | 101495759 A | 7/2009 |
| CN | 101578738 A | 11/2009 |
| JP | 62165884 A | 7/1987 |
| JP | H03138105 A | 6/1991 |
| JP | 0636248 U | 5/1994 |
| JP | 2001267022 A | 9/2001 |
| JP | 2006344503 A | 12/2006 |
| JP | 3138105 U | 12/2007 |
| JP | 2009506732 A | 2/2009 |
| JP | 2009506733 A | 2/2009 |
| WO | 2007022657 A1 | 3/2007 |

* cited by examiner

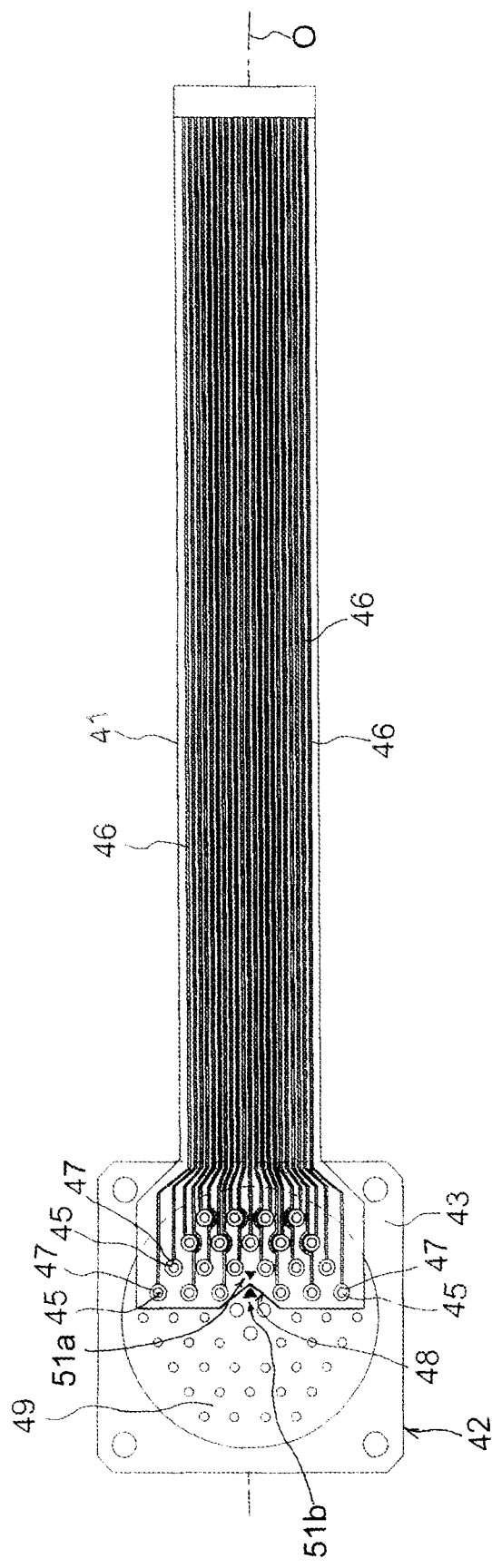
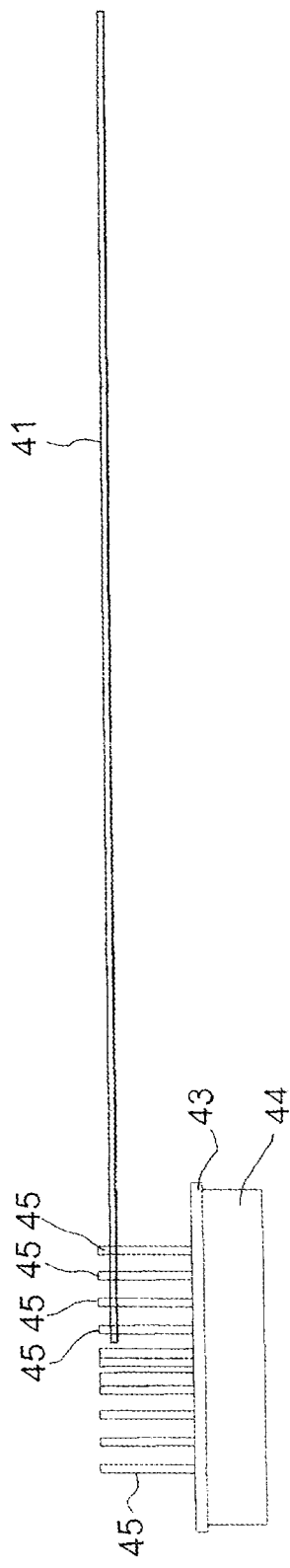
FIG. 3A
FIG. 3B

VACUUM PUMP

This application is a national stage entry under 35 U.S.C. § 371 of International Application No. PCT/JP2014/065153, filed Jun. 6, 2014, which claims the benefit of JP Application 2013-179431, filed Aug. 30, 2013. The entire contents of International Application No. PCT/JP2014/065153 and JP Application 2013-179431 are incorporated herein by reference.

TECHNICAL FIELD

The present disclosure relates to a vacuum pump and more particularly to a vacuum pump that can be used in a pressure range from medium vacuum to ultra-high vacuum in an industrial vacuum system used in semiconductor manufacturing, high-energy physics, and the like.

BACKGROUND

With the recent developments in electronics, there has been a drastically growing demand for semiconductor devices such as memories and integrated circuits. These semiconductor devices are manufactured by imparting electrical properties to an extremely pure semiconductor substrate (wafer) through doping of impurities to the substrate or by etching a semiconductor substrate to form a microscopic circuit thereon. These processes need to be executed inside a high-vacuum chamber in order to avoid any impact of dust in the air, etc. and generally a vacuum pump is used to exhaust the chamber, this vacuum pump already being well known (see Japanese Patent Application Laid-open No. 2006-344503 and Japanese Utility Model Registration Application Publication No. 3138105, for example).

This type of vacuum pump is provided with a pump main body and a control unit for controlling the drive of the pump main body by inputting/outputting power or a control signal to/from the pump main body. A wire cable formed by coating the outer circumference of a core wire with insulation vinyl or the like is used to input/output power or a control signal between the pump main body and the control unit. The number of wire cables used is approximately forty or more, taking up large space in the vacuum pump.

In a conventional vacuum pump such as those disclosed in Japanese Patent Application Laid-open No. 2006-344503 and Japanese Utility Model Registration Application Publication No. 3138105, wire cables that are each formed by coating the outer circumference of a core wire with insulation vinyl or the like are used to input/output power or a control signal between the pump main body and the control unit, as described above. For this reason, the wire cables take up large space in the vacuum pump, making the vacuum pump heavy and interfering with an attempt to reduce the size and weight of the vacuum pump.

Moreover, the wire cables are expensive, increasing the cost of the vacuum pump. Although each wire cable is flexible, bending a bundle of a plurality of wire cables at once requires great force, deteriorating the workability of the vacuum pump.

An object of the present disclosure is to solve the technical problems occurring when providing a vacuum pump with which size and weight reduction, improvement of workability, and cost reduction can be realized.

SUMMARY

The present disclosure was conceived in order to achieve this object. In some examples, a vacuum pump has a pump main body with a rotor and a control unit for controlling a drive of the pump main body, an electrical connection in the pump main body, an electrical connection in the control unit, or an electrical connection between the pump main body and the control unit, in the vacuum pump, being connected by a cable, wherein at least a part of the cable is configured with a flexible printed wiring board obtained by forming a wiring pattern on a surface of a sheet-like insulating substrate.

According to this configuration, a flexible printed wiring board is used on at least a part of the cable that is used for establishing electrical connection within the pump main body, electrical connection within the control unit, or electrical connection between the pump main body and the control unit, reducing the space taken up by the cable more as compared to a wire cable. Moreover, the flexible printed wiring board can be bent and pulled easily to a required position.

In some examples, the control unit is attached to the pump main body.

According to this configuration, because the pump main body and the control unit are integrated, a compact vacuum pump can be realized.

In some examples, the flexible printed wiring board has a connector attached to at least one end side thereof.

According to this configuration, electrical connection within the pump main body, electrical connection within the control unit, or electrical connection between the pump main body and the control unit can easily be established through the use of the flexible printed wiring boar and the connector.

In some examples, the connector has a plurality of pins, to be connected to the flexible printed wiring board.

According to this configuration, a terminal of the flexible printed wiring board and the pins of the connector can be electrically connected to each other easily by inserting the pins of the connector into holes of the flexible printed wiring board.

In some examples, the plurality of pins are arranged in symmetric positions with respect to a center of a direction in which the flexible printed wiring board extends, and the connector is provided with an indication means for indicating a direction of attaching the flexible printed wiring board.

According to this configuration, the flexible printed wiring board can be attached in the correct direction by attaching the flexible printed wiring board to the connector according to the instruction from the indication means of the connector.

In some examples, the flexible printed wiring board has a plurality of holes and a plurality of terminals surrounding the plurality of holes and connected to the wiring pattern.

According to this configuration, the terminals of the flexible printed wiring board and the pins of the connector can be electrically connected to each other easily by inserting the pins of the connector into the holes of the flexible printed wiring board.

In some examples, the flexible printed wiring board is provided with an indication means for indicating a direction of attaching the flexible printed wiring board.

According to this configuration, the flexible printed wiring board can be attached in the correct direction by attaching the flexible printed wiring board to the connector according to the instruction from the indication means of the flexible printed wiring board.

In some examples, the flexible printed wiring board is used on at least a part of the cable used for establishing electrical connection within the pump main body, electrical connection within the control unit, or electrical connection between the pump main body and the control unit, to reduce the space and weight of the cable, resulting in size/weight reduction of the vacuum pump. In addition, the materials used can be reduced and the cable can easily be pulled to a required position, improving the workability of the vacuum pump and achieving cost reduction.

In some examples, the pump main body and the control unit are integrated, realizing a compact vacuum pump. Consequently, the effect of size reduction can be expected.

In some examples, electrical connection within the pump main body, electrical connection within the control unit, or electrical connection between the pump main body and the control unit can easily be established through the use of the flexible printed wiring board and the connector. Consequently, further improvement of the workability of the vacuum pump and cost reduction thereof can be expected.

In some examples, the flexible printed wiring board and the connector can be electrically connected to each other easily by inserting the pins of the connector into the holes of the flexible printed wiring board. Consequently, further improvement of the workability of the vacuum pump and cost reduction can be expected.

In some examples, the flexible printed wiring board can be attached in the correct direction by attaching the flexible printed wiring board to the connector according to the instruction from the indication means of the connector. Consequently, further improvement of the workability of the vacuum pump and reliability thereof can be expected.

In some examples, the terminals of the flexible printed wiring board and the pins of the connector can be electrically connected to each other easily by inserting the pins of the connector into the holes of the flexible printed wiring board. Consequently, further improvement of the workability of the vacuum pump and reliability thereof can be expected.

In some examples, the flexible printed wiring board can be attached in the correct direction by attaching the flexible printed wiring board to the connector according to the instruction from the indication means of the flexible printed wiring board. Consequently, further improvement of the workability of the vacuum pump and reliability thereof can be expected.

BRIEF DESCRIPTION OF THE DRAWINGS

FIGS. 3A and 3B each show a cable of the vacuum pump in which a connector is attached to a flexible printed wiring board, FIG. 3A being a plan view and FIG. 3B a side view.

DETAILED DESCRIPTION

In order to achieve the object of the present disclosure, which is to provide a vacuum pump with which size and weight reduction, improvement of workability, and cost reduction can be realized, the present disclosure has designed a vacuum pump in which a pump main body with a rotor and a control unit for controlling the drive of the pump main body are electrically connected to each other by a cable through which power or a control signal is input/output, wherein the cable is formed with a flexible printed wiring board configured by printing a wiring pattern on a surface of a sheet-like insulating substrate.

An example of a vacuum pump according to an embodiment of the present disclosure is described hereinafter in detail with reference to the drawings.

EXAMPLE

Figure 1:
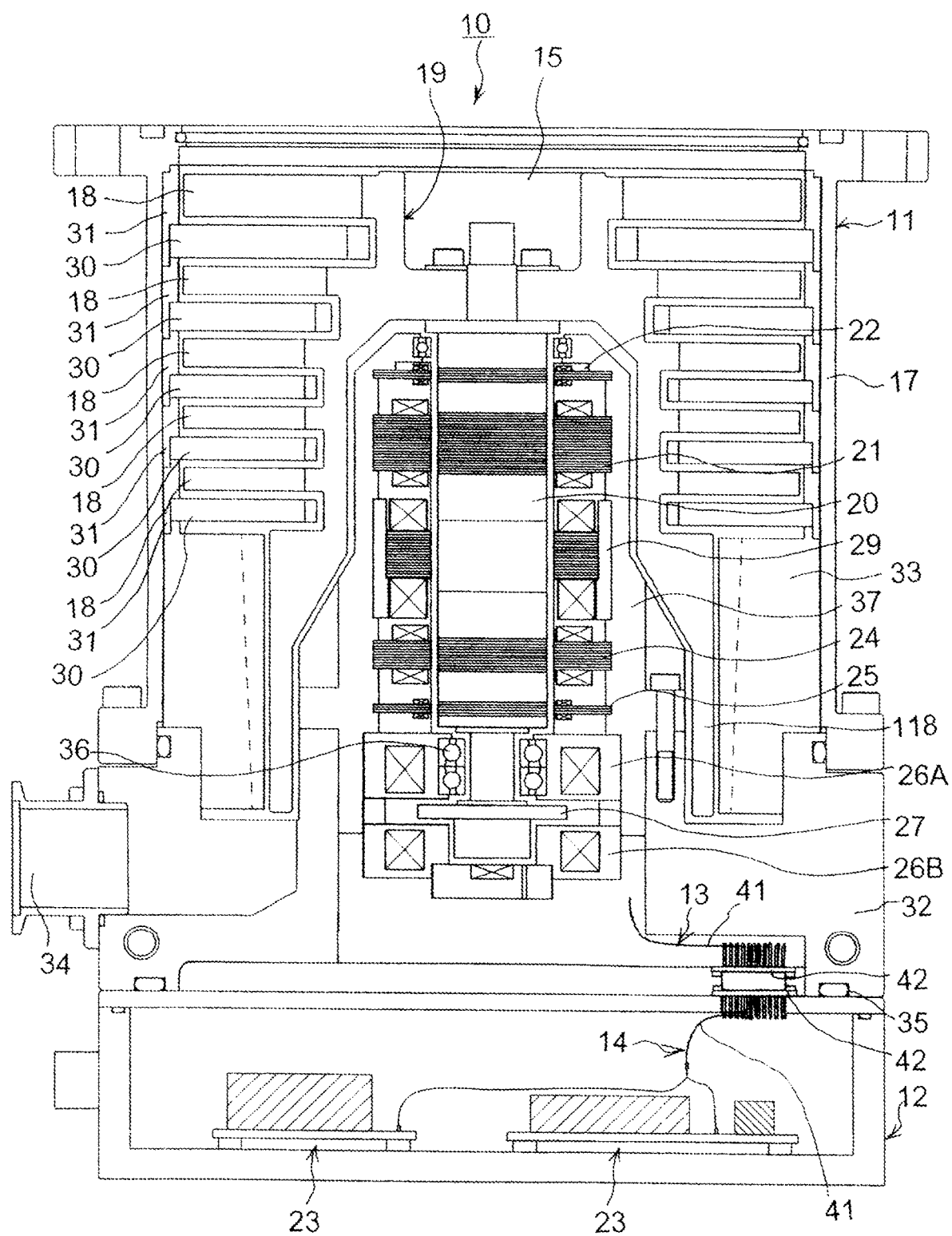
FIG. 1 is a cross-sectional diagram of a vacuum pump according to an embodiment of the present disclosure.
Figure 2:
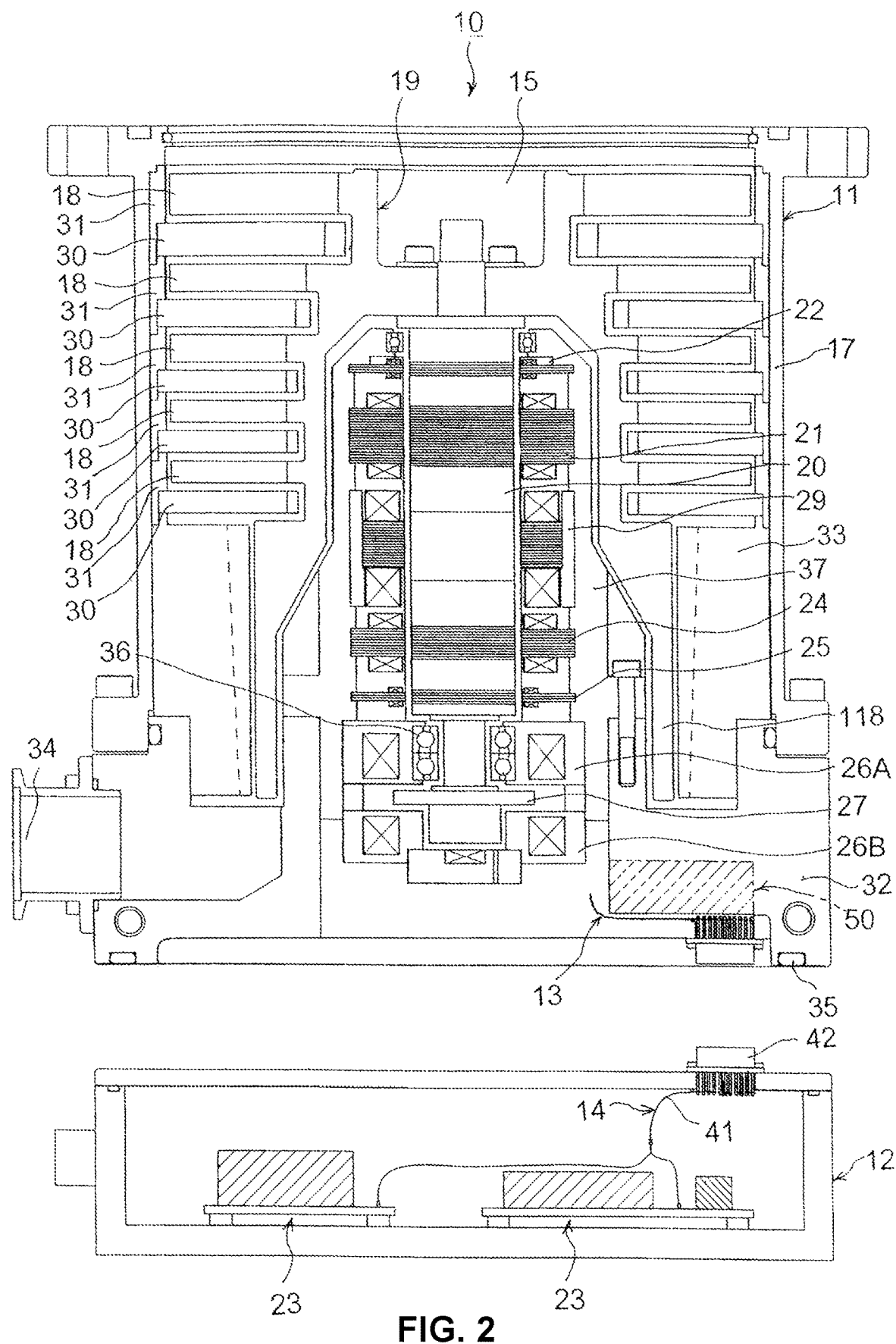
FIG. 2 is a cross-sectional diagram of the vacuum pump in which a control unit is removed from a pump main body.

FIGS. 1 and 2 each show a vacuum pump according to the present disclosure. FIG. 1 is a cross-sectional diagram of the vacuum pump in which a control unit is attached to a pump main body. FIG. 2 is a cross-sectional diagram of the vacuum pump in which the control unit is detached from the pump main body.

In FIGS. 1 and 2, a vacuum pump 10 has a pump main body 11 for vacuum exhaustion and a control unit 12 for controlling the drive of the pump main body 11. The control unit 12 is attached removably to a lower surface of the pump main body 11. The control unit 12 and the pump main body 11 are electrically connected to each other by cables 13, 14, described hereinafter, and power or a control signal can be input/output through the cables 13, 14.

More specifically, the pump main body 11 has an inlet port 15 formed at an upper end of a tubular outer cylinder 17. Inside the outer cylinder 17, there is provided a rotor 19 on which a plurality of rotary blades 18 for suctioning and pumping out the gas are formed, the rotary blades being formed in multiple steps on circumferential portions of the rotor 19.

A rotor shaft 20 is attached to the middle of the rotor 19. The rotor shaft 20 is, for example, supported in a floating manner in midair and has its position controlled by a 5-axis control magnetic bearing.

Upper radial electromagnets 21 are constituted by four, i.e. two pairs of, electromagnets, the two pairs of electromagnets being disposed in the X-axis and the Y-axis, respectively. Four upper radial sensors 22 are provided in the proximity of the upper radial electromagnets 21 so as to correspond thereto. The upper radial sensors 22 detect a radial displacement of the rotor 19 and transmit a signal indicating the radial displacement to a control circuit 23 of the control unit 12 through the cables 13, 14.

Based on the displacement signal transmitted by the upper radial sensors 22, the control unit 12 controls the excitation of the upper radial electromagnets 21 by means of an output of the control circuit 23 having a PID adjustment function, and adjusts the upper radial position of the rotor shaft 20. The control circuit 23 converts an analog sensor signal corresponding to a displacement of the rotor shaft 20 detected by the upper radial sensors 22 into a digital signal using an A/D converter, processes the digital signal, and raises the rotor shaft 20 by adjusting the current that flows through the upper radial electromagnets 21.

In order to make fine adjustments to the current that flows through the upper radial electromagnets 21, the current flowing through the upper radial electromagnets 21 is measured and fed-back to the control circuit 23.

The rotor shaft 20 is made out of a material of high permeability (e.g., iron) and is drawn by the magnetic force of the upper radial electromagnets 21. This adjustment is performed in the X-axis direction and the Y-axis direction separately.

Lower radial electromagnets 24 and lower radial sensors 25 are disposed in the same manner as the upper radial electromagnets 21 and the upper radial sensor 22, and the lower radial position of the rotor shaft 20 is adjusted by the control unit 12, as with the upper radial position of the same.

Axial electromagnets 26A, 26B are disposed above and below a circular metal disc 27 provided in the lower portion of the rotor shaft 20, in such a manner as to sandwich the metal disc 27. The metal disc 27 is made out of a material of high permeability such as iron. An axial sensor 28 is provided facing an axial end surface of the rotor shaft 20 in order to detect an axial displacement of the rotor shaft 20, wherein an axial displacement signal is transmitted to the control circuit 23.

Based on this axial displacement signal, the excitation of the axial electromagnets 26A, 26B is controlled by means of an output of an amplifier that is obtained through the control circuit 23 of the control unit 12 that has a PID adjustment function. The axial electromagnet 26A draws the metal disc 27 upward using the magnetic force thereof, while the axial electromagnet 26B draws the metal disc 27 downward.

The control unit 12 properly adjusts the magnetic force of the axial electromagnets 26A, 26B acting on the metal disc 27 in this manner, to keep the rotor shaft 20 floating magnetically in the axial direction in the pump main body 11 so that the rotor shaft 20 stays non-contact in the space.

A motor 29 has a plurality of magnetic poles that are disposed circumferentially to surround the rotor shaft 20. Each of these magnetic poles is controlled to rotary drive the motor 29 based on a power signal that is output from a drive circuit through a motor control circuit of the control unit 12 that has a PWM control function. In addition, a rotation speed sensor and a motor temperature sensor, both not shown, are attached to the motor 29, and the control circuit 23 of the control unit 12 controls the rotation of the rotor shaft 20 in response to detection signals from the rotation speed sensor and the motor temperature sensor.

A plurality of stator blades 30 are arranged with small distances to the rotary blades 18. The rotary blades 18 transfer the exhaust gas molecules downward by collision and are therefore inclined by a predetermined angle from a plane perpendicular to the axis of the rotor shaft 20.

The stator blades 30, too, are inclined by a predetermined angle from the plane perpendicular to the axis of the rotor shaft 20, and are also arranged alternately with the rotary blades 18, facing the inside of the outer cylinder 17. One end of each stator blade 30 is inserted and supported between a plurality of stacked stator blade spacers 31.

Each of the stator blade spacers 31 is a ring-shaped member and made out of metal such as aluminum, iron, stainless steel, or copper, or a metal alloy containing these metals. The outer cylinder 17 is fixed to the outer circumferences of the stator blade spacers 31 with a small space therebetween. The bottom portion of the outer cylinder 17 is provided with a base portion 32, and a threaded spacer 33 is disposed between the lower portion of the stator blade spacers 31 and the base portion 32. An outlet port 34 is formed below the threaded spacer 33 inside the base portion 32 and is communicated to the outside.

The threaded spacer 33 is a cylindrical member made out of aluminum, copper, stainless steel, iron or a metal alloy containing these metals. Although not shown, a plurality of spiral thread grooves are engraved on the inner circumferential surface of the threaded spacer 33. The direction of the spiral of each thread groove is the direction in which the molecules of the exhaust gas are transferred toward the outlet port 34 when moving in the rotational direction of the rotor 19.

A rotary blade 118 is suspended at the lowest portion leading to the rotary blades 18 of the rotor 19. The outer circumferential surface of the rotary blade 118 is shaped into a cylinder, protrudes toward the inner circumferential surface of the threaded spacer 33, and is positioned adjacent to the inner circumferential surface of the threaded spacer 33 with a predetermined distance therebetween.

The base portion 32 is a disk-shaped member configuring the bottom portion of the pump main body 11 and is generally made out of metal such as iron, aluminum, or stainless steel.

Because the base portion 32 functions not only to physically retain the pump main body 11 but also as a thermal conduction path, it is preferred that rigid metal of high thermal conductivity such as iron, aluminum, or copper be used.

At the lower surface of the base portion 32, the cable 13 provided on the pump main body 11 side and the cable 14 provided on the control unit 12 side are connected, and then the control unit 12 is removably attached by a bolt or the like coaxially with the shaft center of the pump, assembling a compact, small vacuum pump. When attaching the control unit 12, a sealing member 35 is disposed between the base portion 32 and the control unit 12 so that the inside of the pump main body 11 can be kept evacuated.

The cable 13 provided on the pump main body 11 side and the cable 14 provided on the control unit 12 side are each configured with a flexible printed wiring board 41 and a connector 42 attached to one end of the wiring board 41. Furthermore, the cable 13 and the cable 14 basically share the same structure, except that the other end of the flexible printed wiring board 41 on the pump main body 11 side is attached to a terminal block of the pump main body 11, not shown, while the other end of the flexible printed wiring board 41 on the control unit 12 side is connected to a circuit board of the control circuit 23, and that the connector 42 on the pump main body 11 side and the connector 42 on the control unit 12 side are a male terminal and a female terminal respectively and are detachable from each other. The structure of the cables 13, 14 is described hereinafter with reference to FIGS. 3 to 5, mainly with the cable 13 provided on the pump main body 11 side.

As shown in FIG. 3, the cable 13 is configured with the flexible printed wiring board 41 and the connector 42 attached to one end of the flexible printed wiring board 41.

Figure 5A:
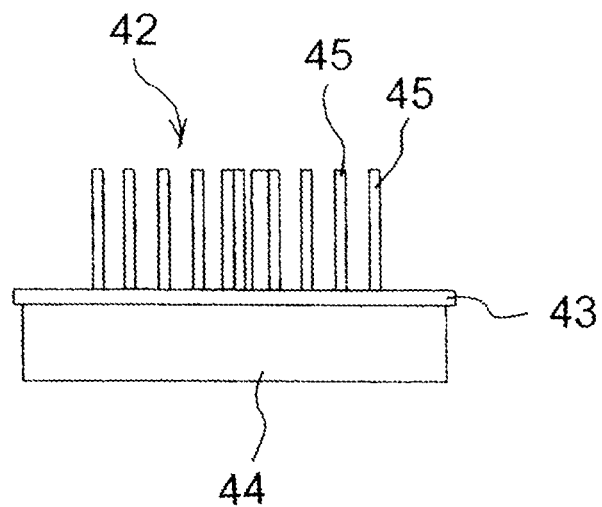
FIGS. 5A and 5B each show the connector alone shown in FIG. 3, FIG. 5A being a side view thereof and FIG. 5B a plan view.
Figure 5B:
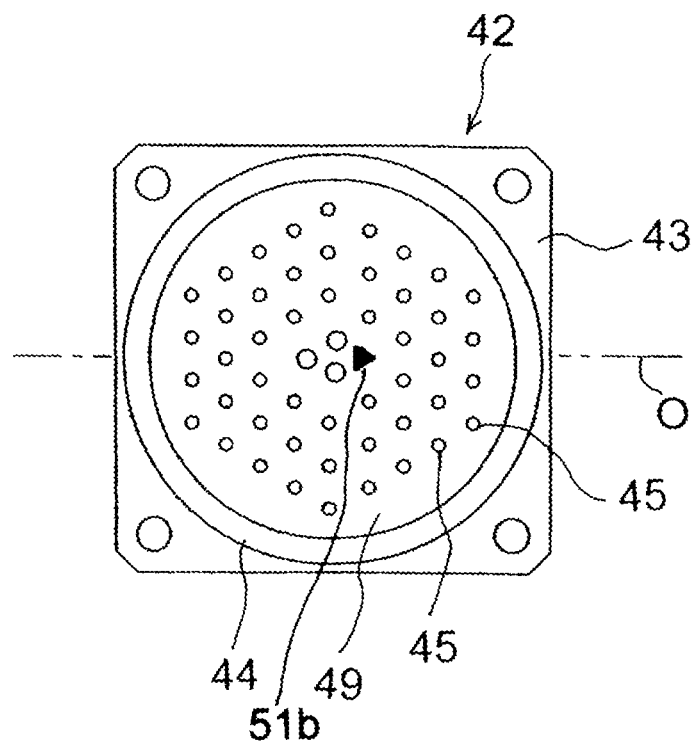

As shown in detail in FIG. 5 in addition to FIG. 3, the connector 42 is configured with a cylindrical connector main body 44, the outer circumference of which is provided integrally with a fitting flange 43, a plurality of contact pins (terminals) 45 arranged in parallel configuration in the axial direction in the connector main body 44, an insulator 49 for electrically insulating the contact pins 45 from each other, and the like. The plurality of contact pins 45 are arranged in an orderly fashion so as to be symmetric with respect to a center line O extending in the direction in which the flexible printed wiring board 41 extends. Each of the contact pins 45 has one end side thereof connected to the flexible printed wiring board 41 and protruding significantly from the connector main body 11 to the outside, as shown in FIGS. 3 and 5. The other end sides of the contact pins 45 are connected to the connector 42 provided on the control unit 12 side and protrude into the space of the connector main body 44 so as to be connected to a plurality of respective female contact pins provided to the connector 42 of the control unit 12.

The flexible printed wiring board 41 is obtained by printing a plurality of electric circuits 46, i.e., a wiring pattern, on a sheet-like insulating substrate (e.g., a plastic film) having a thickness t (see FIG. 4) of 12 μm to 50 μm using copper foil or the like of approximately 2 μm to 50 μm in thickness. One end side of each of the electric circuits 46 has a through-hole 47 that corresponds to each of the contact pins 45 of the connector 42 and is configured with a through-hole through which each of the contact pins 45 can be inserted and a terminal surrounding the through-hole. Therefore, the through-holes 47 on the flexible printed wiring board 41 are arranged in an orderly fashion so as to be symmetric with respect to the center line O extending in the direction in which the flexible printed wiring board 41 extends. Moreover, the number of electric circuits 46 is not the same as the number of contact pins 45 of the connector 42; thus, the electric circuits 46 are each provided in a portion that needs to be connected to the control circuit 23 of the control unit 12. The sheet section of a portion that does not need to be connected to the control unit 12 is cut to not interrupt the connection (e.g., the part shown by reference numeral 48). Note that, in the present example, twenty-one contact pins 45 are connected to the through-holes 47 corresponding to these contact pins 45, as shown in FIG. 3.

In the cable 13 configured in the manner described above, the through-holes 47 of the flexible printed wiring board 41 are made correspondent to the contact pins 45 of the connector 42, and the contact pins 45 are inserted into the through-holes 47 to establish engagement therebetween, as shown in FIG. 3. Thereafter, the connector 42 and the flexible printed wiring board 41 are electrically fixed and connected to each other by soldering the contact pins 45 and the through-holes 47 together by solder dipping or the like.

Since the flexible printed wiring board 41 of the resultant cable 13 is bent freely, the connectors 42, 42 can be mechanically and electrically connected to each other between the pump main body 11 and the control unit 12 by pulling the flexible printed wiring board 41 freely to a required position. In case of a conventional wire cable, the cable cannot be bent freely and forms a large bundle of wires, requiring a hatched area 50 shown in FIG. 2. On the other hand, when the flexible printed wiring board 41 of the present example is used, the area 50 is eliminated and the space and weight of the cable 13 can be reduced, accomplishing size/weight reduction of the vacuum pump.

In the cable 13 shown in FIG. 3, the upper electric circuits 46 above the center line O extending in the direction in which the flexible printed wiring board 41 extends receive signals from the upper radial sensor 22 and the like, while the lower electric circuits 46 below the center line O receive signals from the lower radial sensors 25 and the like. Thus, in the case where the electric circuits 46 and the through-holes 47 are symmetric with respect to the center line O of the flexible printed wiring board 41, the flexible printed wiring board 41 is connected to the connector 42 when the upper and lower electric circuits and through-holes are reversed with respect to the center line O, i.e., when the flexible printed wiring board 41 is flipped over and attached to the connector 42.

Figure 4A:
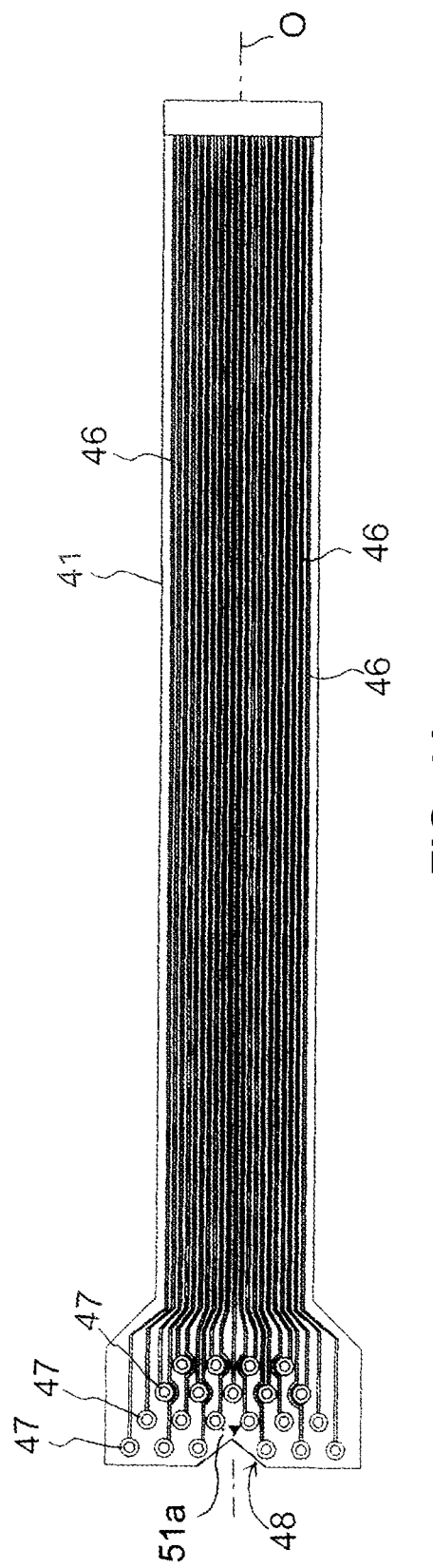
FIGS. 4A and 4B each show the flexible printed wiring board alone shown in FIG. 3, FIG. 4A being a plan view and FIG. 4B a side view.
Figure 4B:

When attaching the flexible printed wiring board 41 is flipped over and attached and connected to the connector 42, a problem might occur, depending on the terminal block of the pump main body, because the signals that are input from the upper radial sensors 22 and the lower radial sensors 25 to the control circuit 23 are reversed. In the present embodiment, as shown in FIGS. 3 and 4, one surface of the flexible printed wiring board 41 and one surface of the connector 42 are provided with triangle, colored marks 51a, 51b, respectively, which function as indication means for indicating the direction of attaching the flexible printed wiring board 41 to the connector 42. Therefore, when assembling these parts, incorrect installation can be prevented by abutting the mark 51a of the flexible printed wiring board 41 against the mark 51b printed on the connector 42, with the surface of the flexible printed wiring board 41 with the mark 51a facing up.

The indication means is not limited to the triangle, colored marks 51a, 51b. For instance, a geometrical mark or a color may be formed between the flexible printed wiring board 41 and the connector 42, to indicate the direction of attaching the flexible printed wiring board 41 to the connector 42. The mark as the indication means may be provided only to the flexible printed wiring board 41 (mark 51a), only to the connector 42 (mark 51b), or to both the flexible printed wiring board 41 (mark 51a) and the connector 42 (mark 51b).

The operations of the vacuum pump 10 configured in the manner described above are described next. First, once the rotary blades 18 are driven by the motor 29 and rotated along with the rotor shaft 19, the exhaust gas of the chamber is suctioned through the inlet port 15 due to the actions of the rotary blades 18 and the stator blades 30. The exhaust gas suctioned through the inlet port 15 is transferred to the base portion 32 through the spaces between the rotary blades 18 and the stator blades 30. The exhaust gas that is transferred to the base portion 32 is sent to the outlet port 34 while being guided by the thread grooves of the threaded spacer 33. The inside of the chamber can be evacuated by continuing this operation.

The present embodiment has indicated that the threaded spacer 33 is disposed on the outer circumference of the rotary blades 18 and that the thread grooves are engraved on the inner circumferential surface of the threaded spacer 33. However, in contrast to this, sometimes the thread grooves are engraved on the outer circumferential surface of the rotary blades 18, and a spacer with a cylindrical inner circumferential surface is disposed around the thread grooves.

The inside of the vacuum pump is kept at a predetermined pressure by purge gas so that the gas suctioned through the inlet port 15 does not enter the electric component configured with the motor 29, the lower radial electromagnets 24, the lower radial sensors 25, the upper radial electromagnets 21, the upper radial sensors 22, and the like.

For this reason, a pipe that is not shown is disposed in the base portion 32, wherein the purge gas is introduced through this pipe. The introduced purge gas is fed to the outlet port 34 through the space between a protective bearing 36 and the rotor shaft 20, the space between the rotor and stator of the motor 29, and the space between a stator column 37 and each rotary blade 18.

The present embodiment has disclosed a structure in which the control unit 12 is attached to the lower surface of the pump main body 11 (the lower surface of the base portion 32) and integrated with the pump main body 11. However, the control unit 12 may be provided in a location separate from the pump main body 11.

Figure 6:
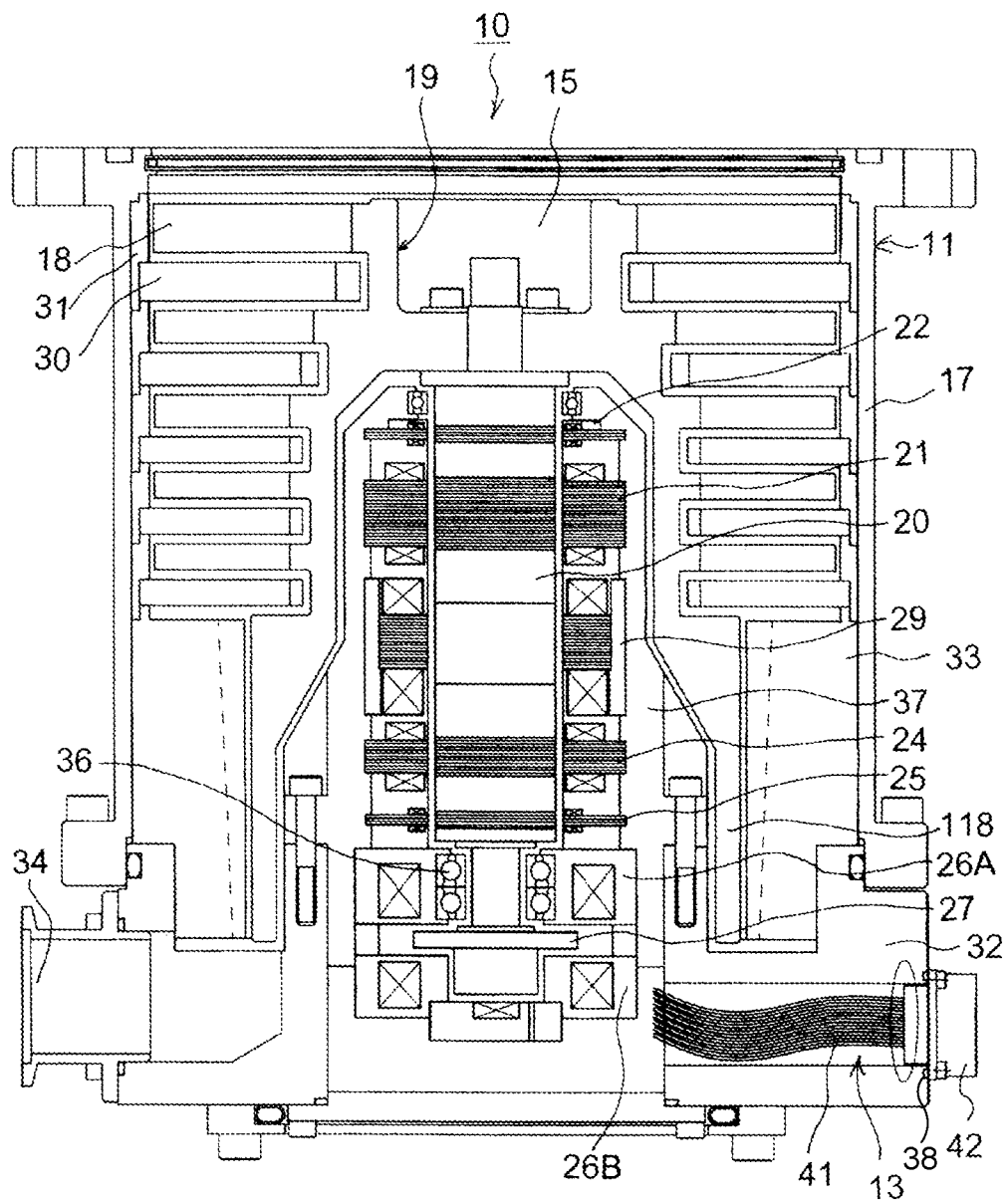
FIG. 6 is a cross-sectional diagram showing a vacuum pump as a modification of the present disclosure.

In this case, the cable 13 pulled out from the pump main body 11 may be fixed to a cable extending from a control unit, not shown, through the connector 42 by freely pulling the flexible printed wiring board 41 in the pump main body 11 and fixing the connector 42 attached to a tip end of the flexible printed wiring board 41 to a side surface of the pump main body 11. This attachment performed here is done so that the inside of the pump main body 11 is kept evacuated by having the sealing member 38 between the base portion 32 and the connector 42. The configuration of the vacuum pump 10 shown in FIG. 6 and the configuration of the vacuum pump 10 shown in FIGS. 1 and 2 are different from each other in that the control unit is provided in another location, but share the same basic configuration of the pump main body 11. Therefore, the same reference numerals are used on the same members, and the overlapping descriptions thereof are omitted accordingly.

Note that the present disclosure has indicated that the flexible printed wiring board configures part of the electrical connection such as a signal line of a radial or axial sensor of a magnetic bearing with less current or a signal line of a rotation speed sensor. However, the configuration of the flexible printed wiring board is not limited thereto, and all the signal lines may be connected by the flexible printed wiring board 41.

In addition, the flexible printed wiring board 41 may be a plurality of layers of flexible printed wiring boards. Such a configuration can reduce the width of the flexile printed wiring boards, resulting in a compact vacuum pump.

Figure 7:
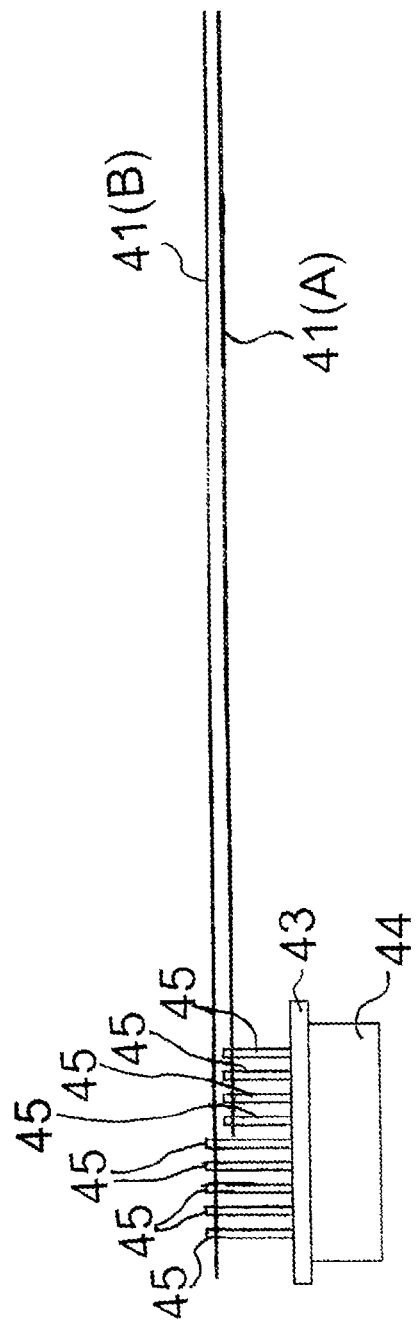
FIG. 7 is a diagram for explaining another example of connecting the flexible printed wiring board and the connector.

The number of flexible printed wiring boards does not have to be one. A configuration can be employed in which a plurality of flexible printed wiring boards are stacked on top of each other, as exemplified in FIG. 7 where a flexible printed wiring board 41(A) and a flexible printed wiring board 41(B) are stacked and wired together. In this case, for example, the flexible printed wiring board 41(B) may be configured as a flexible printed wiring board for electrical connection having a motor electric power line for the motor or large current such as excitation current for the magnetic bearing, and the flexible printed wiring board 41(A) may be configured as a printed wiring board for electrical connection having small current. Configuring the flexible printed wiring boards in this manner allows the thickness of the insulation layer of each wiring board to be changed easily. In so doing, interference with the pins of a vacuum connector can be prevented by changing the length of the pins.

The present disclosure can be modified in various ways without departing from the spirit of the present disclosure. The present disclosure can, of course, cover the modifications.

INDUSTRIAL APPLICABILITY

As described above, the cables used in the present disclosure can be applied to any electrical wiring other than that involved in a vacuum pump.

EXPLANATION OF REFERENCE NUMERALS

10: Vacuum pump; 11: Pump main body; 12: Control unit; 13, 14: Cable; 15: Inlet port; 17: Outer cylinder; 18: Rotary blade; 118: Lowest rotary blade; 19: Rotor; 20: Rotor shaft; 21: Upper radial electromagnet; 22: Upper radial sensor; 23: Control circuit; 24: Lower radial electromagnet; 25: Lower radial sensor; 26A, 26B: Axial electromagnet; 27: Metal disc; 28: Axial sensor; 29: Motor; 30: Stator blade; 31: Stator blade sensor; 32: Base portion; 33: Threaded spacer; 34: Outlet port; 35: Sealing member; 36: Protective bearing; 37: Stator column; 38: Sealing member; 41: Flexible printed wiring board; 42: Connector; 43: Flange; 44: Connector main body; 45: Contact pin; 46: Electric circuit (wiring pattern); 47: Through-hole; 48: Cut section; 49: Insulator; 50: Area used in conventional structure; 51a, 51b: Marks as indication means

What is claimed is:

1. A vacuum pump, comprising:
a pump main body with a rotor;
a control unit for controlling a drive of the pump main body;
an electrical connection in the pump main body, an electrical connection in the control unit, or an electrical connection between the pump main body and the control unit being realized by a cable, wherein at least a part of the cable is configured with a flexible printed wiring board obtained by forming a wiring pattern on a surface of a sheet-like insulating substrate, wherein the flexible printed wiring board has a connector attached to at least one end side thereof, wherein the connector comprises a first plurality of pins connected electrically to electromagnets of a motor or electromagnets of a magnetic bearing and the control unit and a second plurality of pins connected electrically to the control unit, wherein the first plurality of pins and the second plurality of pins are on a same side of the connector, wherein the flexible printed wiring board defines a plurality of holes into which the second plurality of pins penetrate, wherein power being input to the electromagnets of the motor or the electromagnets of the magnetic bearing is supplied through cables connected to the first plurality of pins, wherein a control signal of the vacuum pump is input/output through the flexible printed wiring board.

2. The vacuum pump according to claim 1, wherein the control unit is attached to the pump main body.

3. The vacuum pump according to claim 1, wherein the plurality of pins are arranged in symmetric positions with respect to a center of a direction in which the flexible printed wiring board extends, and the connector is provided with an indication means for indicating a direction of attaching the flexible printed wiring board.

4. The vacuum pump according to claim 1, wherein the flexible printed wiring board has a plurality of terminals surrounding the plurality of holes and connected to the wiring pattern.

5. The vacuum pump according to claim 1, wherein the flexible printed wiring board is provided with an indication means for indicating a direction of attaching the flexible printed wiring board.

6. The vacuum pump according to claim 2, wherein the flexible printed wiring board has a plurality of terminals surrounding the plurality of holes and connected to the wiring pattern.

7. The vacuum pump according to claim 2, wherein the flexible printed wiring board is provided with an indication means for indicating a direction of attaching the flexible printed wiring board.

8. The vacuum pump according to claim 4, wherein the flexible printed wiring board is provided with an indication means for indicating a direction of attaching the flexible printed wiring board.

9. The vacuum pump according to claim 6, wherein the flexible printed wiring board is provided with an indication means for indicating a direction of attaching the flexible printed wiring board.

* * * * *